United States Patent
Schneider et al.

(10) Patent No.: US 10,507,764 B2
(45) Date of Patent: Dec. 17, 2019

(54) VEHICLE INTERIOR TRIM ASSEMBLY CONFIGURED TO FORM A LIGHT PATTERN HAVING AN EMBLEM SHAPE AT THE FRONT OF A TRIM PART SUCH AS AN AIR BAG COVER

(71) Applicant: JVIS-USA, LLC, Sterling Heights, MI (US)

(72) Inventors: Ingo E. Schneider, Washington, MI (US); Richard L. Arundale, Leonard, MI (US); Remon S. Jiddou, Sterling Heights, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 187 days.

(21) Appl. No.: 15/637,054

(22) Filed: Jun. 29, 2017

(65) Prior Publication Data
US 2019/0001880 A1   Jan. 3, 2019

(51) Int. Cl.
*B60Q 3/00*  (2017.01)
*B60Q 3/74*  (2017.01)
*B60Q 3/62*  (2017.01)
*B60Q 3/14*  (2017.01)
*F21V 8/00*  (2006.01)
*H01H 9/18*  (2006.01)

(52) U.S. Cl.
CPC .............. *B60Q 3/745* (2017.02); *B60Q 3/14* (2017.02); *B60Q 3/62* (2017.02); *G02B 6/0008* (2013.01); *H01H 2009/187* (2013.01); *H01H 2231/026* (2013.01)

(58) Field of Classification Search
CPC . B60Q 3/745; B60Q 3/14; B60Q 3/62; B60K 2350/2034; G02B 6/0008; H01H 2009/183; H01H 2009/187; H01H 9/182
See application file for complete search history.

(56) References Cited

U.S. PATENT DOCUMENTS

| | | |
|---|---|---|
| 5,005,108 A | 4/1991 | Pristash et al. |
| 5,542,694 A | 8/1996 | Davis |
| 5,549,323 A | 8/1996 | Davis |
| 5,558,364 A | 9/1996 | Davis |

(Continued)

FOREIGN PATENT DOCUMENTS

GB    2492100 A    12/2012

*Primary Examiner* — Y M. Lee
(74) *Attorney, Agent, or Firm* — Brooks Kushman P.C.

(57) ABSTRACT

A vehicle interior trim assembly and an illuminable emblem assembly is provided. The assembly includes a vehicle interior trim part such as an air bag cover which has at least one opening which defines an emblem pattern. An illumination module including at least one light source is configured to generate visible light rays when energized. A lens including at least one layer is molded in a molding process to have a 3D emblem shape fitted through and matching the at least one opening. The lens has at least one surface-defining portion which is sized and shaped to have the emblem pattern at the front surface of the part. The lens gathers and redirects light rays from the illumination module to generate light in the emblem pattern of substantially uniform intensity through the at least one surface-defining portion and into a passenger compartment of the vehicle.

30 Claims, 8 Drawing Sheets

(56) References Cited

U.S. PATENT DOCUMENTS

| | | | |
|---|---|---|---|
| 5,687,500 A * | 11/1997 | Lamparter | G09F 13/0413 362/240 |
| 5,895,115 A | 4/1999 | Parker et al. | |
| 5,993,019 A * | 11/1999 | Kline | G09F 13/04 362/23.05 |
| 6,053,526 A | 4/2000 | Preisler et al. | |
| 6,062,595 A | 5/2000 | Ha | |
| 6,158,867 A | 12/2000 | Parker et al. | |
| 6,193,399 B1 | 2/2001 | Hulse | |
| 6,464,381 B2 | 10/2002 | Anderson, Jr. et al. | |
| 6,594,417 B1 | 7/2003 | Hulse | |
| 6,652,128 B2 | 11/2003 | Misaras | |
| 6,676,472 B1 | 1/2004 | Trentelman | |
| 6,974,238 B2 | 12/2005 | Sturt et al. | |
| 7,150,550 B2 | 12/2006 | Bogdan et al. | |
| 7,201,588 B2 | 4/2007 | Nishigaki et al. | |
| 7,237,933 B2 | 7/2007 | Radu et al. | |
| 7,299,892 B2 | 11/2007 | Radu et al. | |
| 7,387,397 B2 | 6/2008 | Konet et al. | |
| 7,441,801 B2 | 10/2008 | Nakamura et al. | |
| 7,866,858 B2 | 1/2011 | Hirzmann | |
| 7,987,030 B2 | 7/2011 | Flores et al. | |
| 8,016,465 B2 | 9/2011 | Egerer et al. | |
| 8,061,861 B2 * | 11/2011 | Paxton | B60Q 3/283 362/84 |
| 8,075,173 B2 | 12/2011 | Shallcross et al. | |
| 8,162,519 B2 | 4/2012 | Salter et al. | |
| 8,210,564 B2 | 7/2012 | Helmstetter et al. | |
| 8,215,810 B2 | 7/2012 | Welch, Sr. et al. | |
| 8,235,567 B2 | 8/2012 | Hipshier et al. | |
| 8,256,945 B2 | 9/2012 | Choquet | |
| 8,408,627 B2 | 4/2013 | Mann | |
| 8,408,766 B2 | 4/2013 | Wilson et al. | |
| 8,425,062 B2 | 4/2013 | Bowden et al. | |
| 8,449,161 B2 | 5/2013 | Igoe et al. | |
| 8,469,562 B2 | 6/2013 | Marzorati et al. | |
| 8,596,803 B2 | 12/2013 | Schultz et al. | |
| 8,627,586 B2 | 1/2014 | Bozio et al. | |
| 8,816,586 B2 | 8/2014 | Marcove et al. | |
| 8,925,959 B2 | 1/2015 | Bosch et al. | |
| 9,067,556 B2 | 6/2015 | Bosch et al. | |
| 9,376,055 B2 | 6/2016 | Sura et al. | |
| 9,446,734 B2 | 9/2016 | Bosch et al. | |
| 9,481,296 B2 | 11/2016 | Roberts et al. | |
| 2003/0209889 A1 | 11/2003 | Erwin et al. | |
| 2004/0047154 A1 * | 3/2004 | Miller | F21S 2/00 362/285 |
| 2009/0021459 A1 | 1/2009 | Satou et al. | |
| 2009/0251917 A1 | 10/2009 | Wollner et al. | |
| 2010/0104780 A1 | 4/2010 | Paxton et al. | |
| 2010/0194080 A1 | 8/2010 | Paxton et al. | |
| 2010/0277938 A1 * | 11/2010 | Smith | B60Q 3/64 362/509 |
| 2011/0002138 A1 | 1/2011 | Hayes et al. | |
| 2012/0188779 A1 * | 7/2012 | Schultz | B60K 37/02 362/488 |
| 2012/0217767 A1 | 8/2012 | Pennington | |
| 2013/0279188 A1 | 10/2013 | Entenmann et al. | |
| 2013/0329447 A1 | 12/2013 | Broer et al. | |
| 2014/0077531 A1 | 3/2014 | Preisler et al. | |
| 2015/0307033 A1 | 10/2015 | Preisler et al. | |

* cited by examiner

VEHICLE INTERIOR TRIM ASSEMBLY CONFIGURED TO FORM A LIGHT PATTERN HAVING AN EMBLEM SHAPE AT THE FRONT OF A TRIM PART SUCH AS AN AIR BAG COVER

TECHNICAL FIELD

This invention generally relates to vehicle interior trim assemblies which are configured to form light patterns having emblem shapes.

OVERVIEW

As described in U.S. Pat. No. 6,676,472, generally, there are two distinct types of lighting applications. In one, direction of the light rays is relatively unimportant. In the other, light rays must be directed in a particular manner subsequent to their generation. With respect to automotive lighting, after light rays are generated by a lamp, they must be focused/dispersed according to somewhat exacting standards. The requirements for light-directed lamps, such as headlights, sidemarkers, tail lights, brake lights, directional, hazards, CHMSLs (center, high-mounted, stop lights), differ. However, they all share the characteristic that their light rays need to be directed in some specific manner.

Lamp elements generate light rays and lenses and/or reflecting elements direct the light rays. Lamp elements generally fall into three categories: light-emitting diode (LED), incandescent and discharge.

Discharge lamps are generally characterized as having a sealed envelope filled with a gas, the atoms/ions of which, when properly excited, give off light rays. Lens elements may be categorized as refractive, Fresnel, or Total Internal Reflection (TIR). TIR lenses have the ability to gather light rays from large solid angles and redirect them efficiently.

Interior lighting systems for automotive and other vehicle applications are generally used for two purposes. One is to provide general area illumination and the other is feature lighting of specific objects, either for aesthetic or functional reasons. Traditionally, these interior lighting systems have utilized incandescent lamps for both area and feature lighting, often using lenses to control the shape and light intensity distribution of the emitted light rays. Although incandescent lamp systems can often be integrated into various vehicle interior trim components in a simple manner, various considerations do arise which complicate their use for automotive lighting. For example, where heat from the lamp could damage adjacent components or otherwise cause problems, thermal management of that heat must be implemented. Also, there is often little room in or behind a particular vehicle interior body panel or trim component for the lamp, socket, and lensing.

More recently, distributed light systems have found use in vehicles. These may use fiber optics or other means to deliver the light rays to a desired location. The use of a lens and focusing or dispersing devices may be employed to direct the light rays. It is well known that light transparent members including for example rods, panels, films, sheets and plates, can be made into light emitting members or illuminators by grooving or notching the members in a certain pattern.

Fiber optic substrates can be made into illuminators by marring or abrading the surface of the optical fibers at various points along their length to cause a portion of the light entering one or both ends of the optical fibers to be emitted from the married surface areas. Increased surface marring results in increased light emission. Accordingly, the intensity of the light emitted along the length of the substrates can be varied by varying the density or aggressiveness of the surface marring.

Such areas as foot wells, door handles, seats, trunks, cargo areas, dashboards, door sills, headliners, grab handles, etc. may be illuminated using a wide combination of technologies. In addition to incandescent lights and fluorescent lighting, LED illumination, cold cathode technology, and electroluminescent technology may now find use.

As described in U.S. Pat. No. 8,816,586, traditionally, logos and emblems have been employed to distinguish and identify the source of various goods or property. In addition to identifying source, manufacturers rely on the use of logos and emblems, in conjunction with the benefit of trademark protection, to establish and protect their reputation. A discerning consumer may recognize a manufacturer by its logo or emblem and immediately be reminded of the manufacturer's reputation.

It is well known that a good reputation is linked with status in a community. For instance, a specific logo or emblem may be associated with a reputation for luxury and quality in the manufacturer of vehicles. As such, the vehicle consumer and or manufacturer may take pride in emphasizing the display of their vehicle's emblems as well as the corresponding good reputation associated therewith. Moreover, an individual may take pride in a specific cultural heritage, country, sports team, cause, or the like. In these cases, the individual may want to emphasize this pride by displaying the representative emblem or logo on or in the passenger compartment of a passenger vehicle.

Historically, the emphasis of a logo or emblem was achieved by increasing the number of logos/emblems on a vehicle or by adjusting the physical size of the logo/emblem itself. However, simply increasing the size and/or quantity of logos/emblems on a vehicle may achieve the desired effect of emphasis, but diminish the effect of status and/or pride proportionally.

Although some solutions may exist in the prior art that are directed to emphasizing the display of a logo or emblem with illumination, they typically involve directing an external light onto a vehicle emblem. Moreover, the directed light is typically a single color, or bulb, and cannot change color to indicate conditions or states associated with the vehicle. Additionally, the light is usually configured to illuminate the entire emblem in a non-uniform manner (i.e., areas of the emblem that are located further from the light source appear darker than the areas of the emblem that are located closer to the light source). Among other things, the prior art solutions fail to provide a dynamic emphasis of a logo or emblem while maintaining a sense of quality, luxury, or status.

Vehicles are commonly provided with various types of decorative trim parts. Vehicles also typically have various logos or designs located on interior trim pieces. However, decorative trim and designs in the vehicle cabin are difficult to perceive in darker conditions. Attempts have been made to illuminate trim logos. This is typically done by either placing the logo within the field of view of a light source or by making the logo element luminescent. The first method is not feasible for logos in most common locations, while the latter method may adversely affect the occupants' vision contrary to government regulations.

Under 49 C.F.R. Part 571.101 (FMVSS 101) 5.53 Illumination, S5.3.4 Brightness of interior lamps.

(a) Any source of illumination within the passenger compartment which is forward of a transverse vertical plane 110 mm rearward of the manikin "H" point with the driver's seat in its rearmost driving position, which is not used for the controls and displays regulated by this standard, which is not a telltale, and which is capable of being illuminated while the vehicle is in motion, shall have either:

(1) Light intensity which is manually or automatically adjustable to provide at least two levels of brightness;
(2) A single intensity that is barely discernible to a driver who has adapted to dark ambient roadway conditions; or
(3) A means of being turned off.

One practice in the automotive industry is utilization of all-plastic, fabricated parts, such as, but not limited to, instrument panels, interior trims, and door panels. It is known in other automotive parts areas that different, aesthetically pleasing outer class A surfaces enhance the overall appearance of the interior of automotive vehicles.

The following patent documents are related to the present invention: UK Patent Application GB 2492100A; U.S. Pat. Nos. 5,005,108; 5,549,323; 5,542,694; 5,558,364; 5,895,115; 6,062,595; 6,053,526; 6,158,867; 6,193,399; 6,464,381; 6,594,417; 6,652,128; 6,676,472; 6,974,238; 7,150,550; 7,201,588; 7,237,933; 7,299,892; 7,387,397; 7,441,801; 7,866,858; 7,987,030; 8,016,465; 8,061,861; 8,075,173; 8,162,519; 8,210,564; 8,215,810; 8,235,567; 8,256,945; 8,408,627; 8,408,766; 8,425,062; 8,449,161; 8,469,562; 8,596,803; 8,627,586; 8,816,586; 8,925,959; 9,067,556; 9,446,734, 9,376,055; and 9,481,296; and U.S. Published Applications 2003/0209889; 2009/0021459; 2009/0251917; 2010/0104780; 2010/0194080; 2011/0002138; 2012/0188779; 2012/0217767; 2013/0279188; 2013/0329447; 2014/0077531; and 2015/0307033.

U.S. published application 2013/0329447 discloses a lighting assembly comprising an optical fiber light guide panel member having a light conducting core cladded on opposite sides by cladding made of optically transparent material having a lower index of refraction than the light conducting core to cause total internal reflection of conducted light within the light conducting core at the core-cladding interface. Disruptions at one or more areas of the cladding cause conducted light within the light conducting core to be emitted from one or more areas of the panel member. Electrical circuitry is bonded to one or both sides of the cladding. One or more LEDs embedded in the panel member are electrically coupled to the electrical circuitry and optically coupled to the light conducting core.

Laser beam ablation may vaporize material to be removed during a manufacturing process. During vaporization, the material absorbs energy delivered by the laser beam. The absorbed laser energy is converted to thermal energy, and at a certain temperature, dependent upon the characteristics of the material being used, vaporization occurs. These characteristics of the material include absorption depth and heat of vaporization. Because the ability to absorb laser energy is dependent upon the material used, the characteristics of the material also limit the depth at which useful ablation can occur. The depth of the laser ablation is also determined by the laser beam pulse duration, the laser beam energy density, and the laser beam wavelength.

Poly(methyl methacrylate) (PMMA), also known as acrylic or acrylic glass as well as by the trade names Plexiglas, Acrylite, Lucite, and Perspex among several others, is a transparent thermoplastic often used in sheet form as a lightweight or shatter-resistant alternative to glass. The same material can be utilized as a casting resin, in inks and coatings, and has many other uses.

Polycarbonates (PC) are a group of thermoplastic polymers containing carbonate groups in their chemical structures. Polycarbonates used in engineering are strong, tough materials, and some grades are optically transparent. They are easily worked, molded, and thermoformed.

Polymers such as PMMA and PC can be made into a diffusing polymer in a number of ways such as by adding light diffusing material such as self-reflecting particles to the polymers.

Despite the teachings of the above patent documents, there is still a need for an easily and inexpensively manufactured vehicle interior trim assembly configured to form a light pattern in an emblem shape of substantially uniform intensity at the front of a part such as an air bag cover.

SUMMARY OF EXAMPLE EMBODIMENTS

An object of at least one embodiment of the present invention is to provide a low cost, compact and light weight vehicle interior trim assembly configured to form a light pattern having an emblem shape of substantially uniform light intensity in a passenger compartment of the vehicle.

In carrying out the above object and other objects of at least one embodiment of the invention, a vehicle interior trim assembly having an illuminable emblem is provided. The assembly includes a vehicle interior trim part having at least one opening which defines an emblem pattern. The at least one opening extends between front and back surfaces of the part. The front surface faces a passenger compartment of the vehicle. An illumination module is mounted to the back surface of the part and includes at least one light source configured to generate visible light rays when energized. A lens includes at least one layer molded in a molding process to have a 3D emblem shape fitted through and matching the at least one opening. The lens has at least one surface-defining portion which is sized and shaped to have the emblem pattern at the front surface of the part. The lens gathers and redirects light rays from the illumination module to generate light in the emblem pattern of substantially uniform intensity through the at least one surface-defining portion and into the passenger compartment.

The at least one layer may comprise a single layer molded from a transparent, optical-grade material.

The at least one layer may comprise a single layer molded form an optical-grade material which causes the light rays to emerge diffusely from the at least one surface-defining portion.

The assembly may further comprise a layer of light-diffusing coating material overlying the at least one surface-defining portion and having substantially the same size and shape as the at least one surface-defining portion.

The layer of coating material may include a paint layer.

The lens may have a set of surface-defining portions which are sized, shaped and arranged laterally relative to each other in the emblem pattern at the front surface of the part.

The assembly may further comprise an opaque layer covering the layer of coating material to block light rays from entering the passenger compartment from the covered layer of coating material and to allow light rays to emerge diffusely from the layer of coating material not covered by the opaque layer.

The opaque layer may comprise an opaque paint layer.

The lens may include a first layer molded from a transparent, optical grade material in the molding process and a second layer bonded to the first layer and formed from a diffuse material molded onto the first layer in the molding process.

The molding process may be an injection molding process such as a multi-shot molding process.

The lens may include a first layer molded from a transparent, optical-grade material and formed as a first integral unitary structure and a second layer molded from a diffuse material and formed as a second integral unitary structure, wherein the layers are snapped-into engagement to form the lens.

The at least one light source may include at least one light emitting diode (LED) which flanks the lens.

The illumination module may include an electrically conductive circuit wherein the LED is electrically coupled to the circuit.

The opaque layer overlying the layer of coating material may be engraved by a laser beam having energy of a predetermined wavelength which is absorbed by the opaque layer to at least initiate ablation of the material of the opaque layer in the emblem pattern.

Further in carrying out the above object and other objects of at least one embodiment of the present invention, a vehicle air bag cover assembly having an illuminable emblem is provided. The assembly includes a vehicle air bag cover having at least one opening which defines am emblem pattern. The at least one opening extends between front and back surfaces of the air bag cover. The front surface faces a passenger compartment of the vehicle. An illumination module is mounted to the back surface of the air bag cover and includes at least one light source configured to generate visible light rays when energized. A lens including at least one layer molded in a molding process to have a 3D emblem shape is fitted through and matches the at least one opening. The lens has at least one surface-defining portion which is sized and shaped to have the emblem pattern at the front surface of the air bag cover. The lens gathers and redirects light rays from the illumination module to generate light in the emblem pattern of substantially uniform intensity through the at least one surface-defining portion and into the passenger compartment.

The at least one layer may comprise a single layer molded from a transparent, optical-grade material.

The at least one layer may comprise a single layer molded from an optical-grade material which causes the light rays to emerge diffusely from the at least one surface-defining portion.

The assembly may further comprise a layer of light-diffusing coating material overlying the at least one surface-defining portion and having substantially the same size and shape as the at least one surface-defining portion.

The layer of coating material may include a paint layer.

The assembly may further comprise an opaque layer partially overlying the layer of coating material to block light rays from entering the passenger compartment from the covered layer of coating material and to allow light rays to emerge diffusely from the layer of coating material not covered by the opaque layer.

The lens may have a set of surface-defining portions which are sized, shaped and arranged laterally relative to each other in the emblem pattern at the front surface of air bag.

The opaque layer may comprise an opaque paint layer.

The lens may include a first layer molded from a transparent, optical-grade material in the molding process and a second layer bonded to the first layer and formed from a diffuse material molded onto the first layer in the molding process.

The molding process may be an injection molding process such as a multi-shot molding process.

The lens may include a first layer molded from a transparent, optical-grade material and formed as a first integral unitary structure and a second layer molded from a diffuse material and formed as a second integral unitary structure wherein the layers are snapped-into engagement to form the lens.

The at least one light source may include at least one light emitting diode (LED) which flanks the lens.

The illumination module may include an electrically conductive circuit wherein the LED is electrically coupled to the circuit.

The opaque layer overlying the layer of coating material may be engraved by a laser beam having energy of a predetermined wavelength which is absorbed by the opaque layer to at least initiate ablation of the material of the opaque layer in the emblem pattern.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "overlies" and cognate terms such as "overlying" and the like, when referring to the relationship of one or a first, superjacent layer relative to another or a second, subjacent layer or surface, means that the first layer partially or completely lies over the second layer or surface. The first, superjacent layer overlying the second, subjacent layer or surface may or may not be in contact with the subjacent layer or surface; one or more additional layers may be positioned between respective first and second, or superjacent and subjacent, layers or surfaces.

Referring now to FIGS. 1-5 there is illustrated a vehicle interior trim assembly, generally indicated at 110, having an illuminable emblem constructed in accordance with a first embodiment of the present invention.

Figure 7:
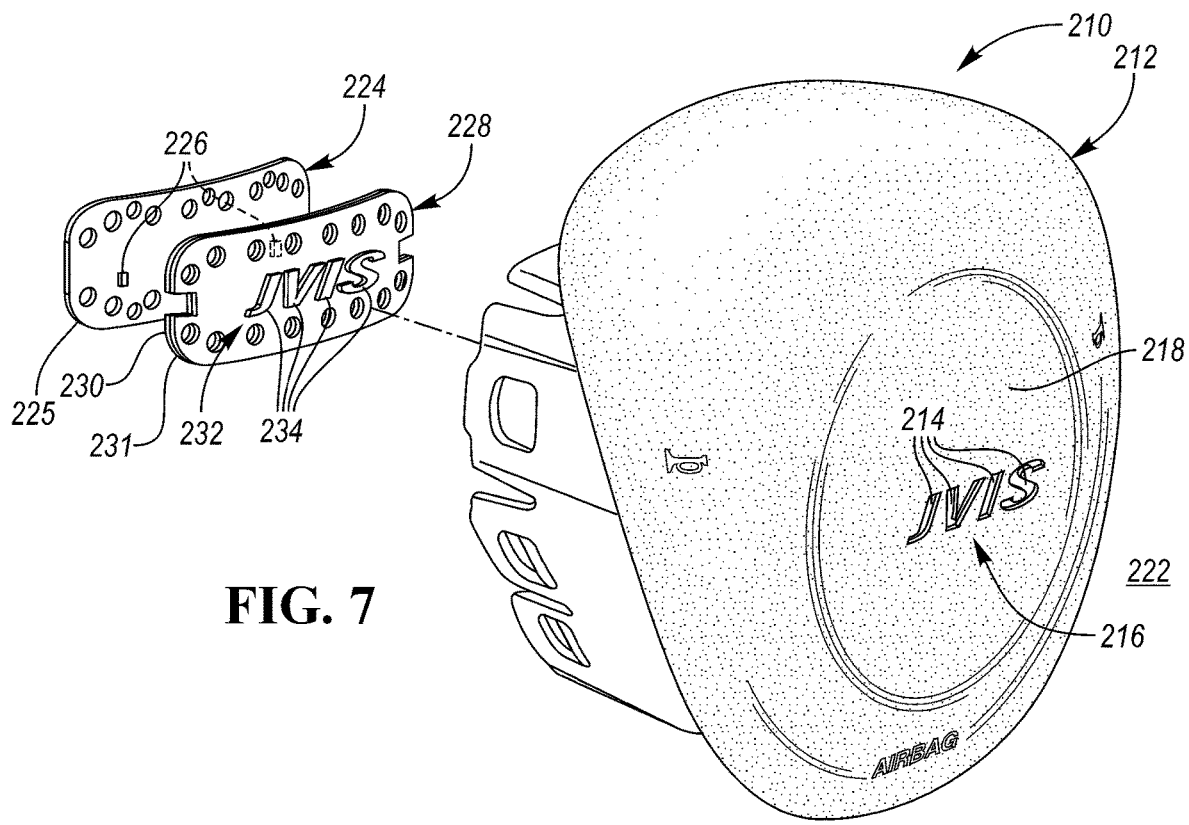
FIG. 7 is an uploaded perspective view of a vehicle interior trim assembly constructed in accordance with a second embodiment of the invention.
Figure 8:
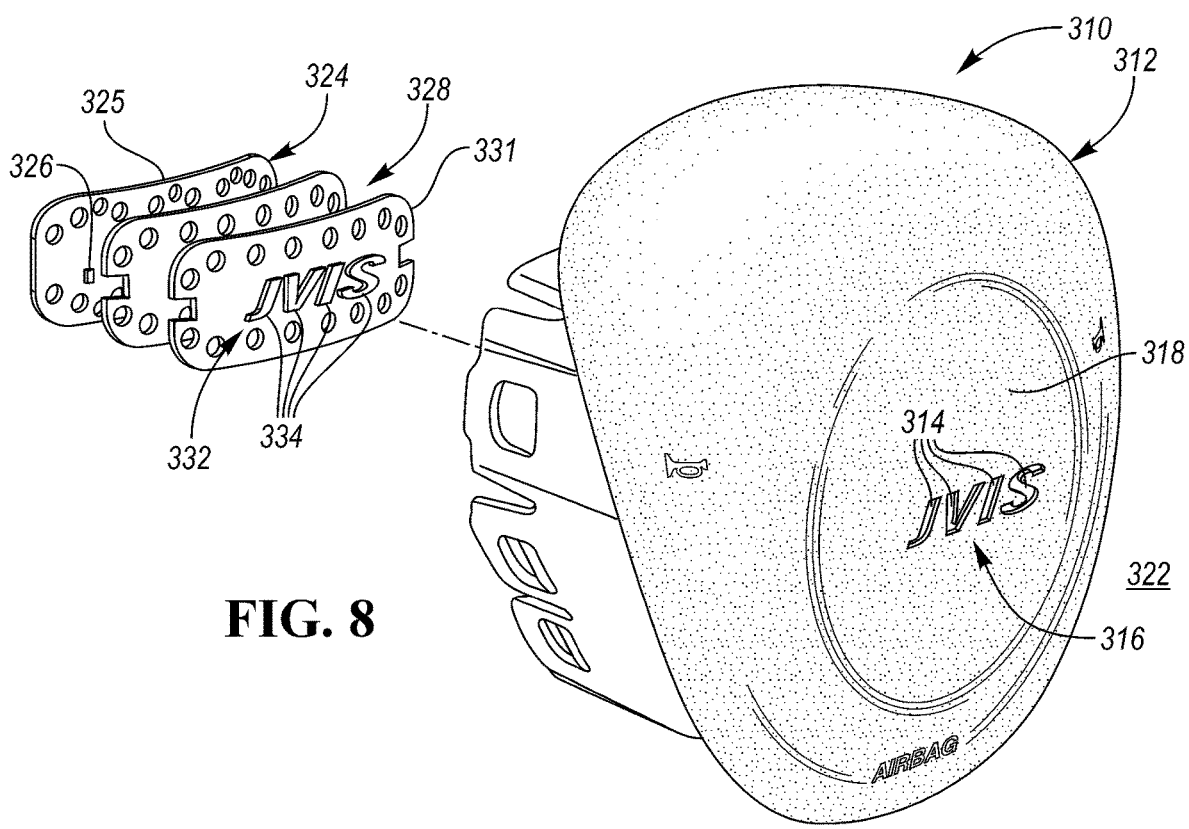
FIG. 8 is an uploaded perspective view of a vehicle interior trim assembly constructed in accordance with a third embodiment of the invention.
Figure 9:
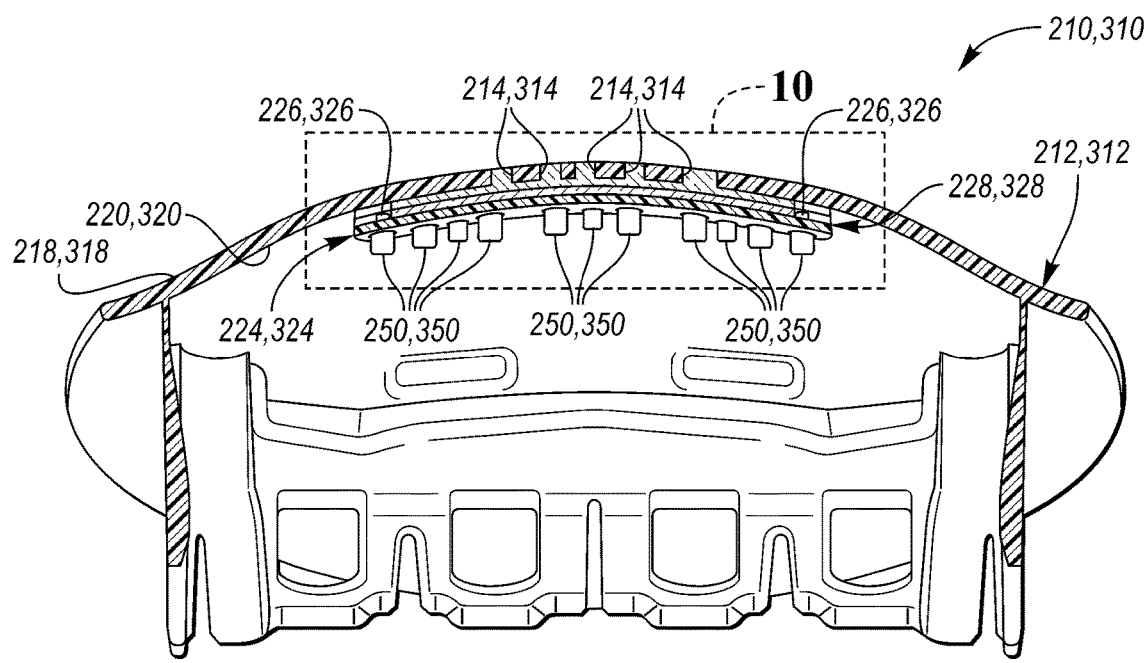
FIG. 9 is a side sectional view of both the assembly of FIG. 7 and the assembly of FIG. 8.
Figure 10:
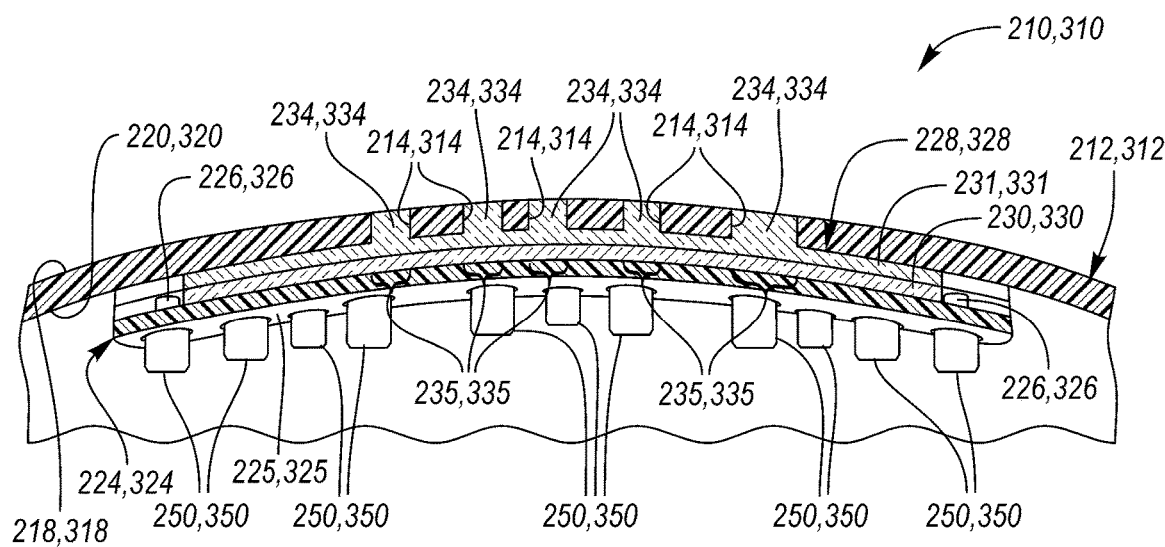
FIG. 10 is an enlarged view, partially broken away and in cross section of the assembly of FIG. 7 and the assembly of FIG. 8 contained within the box labeled "10" in FIG. 9.
Figure 11:
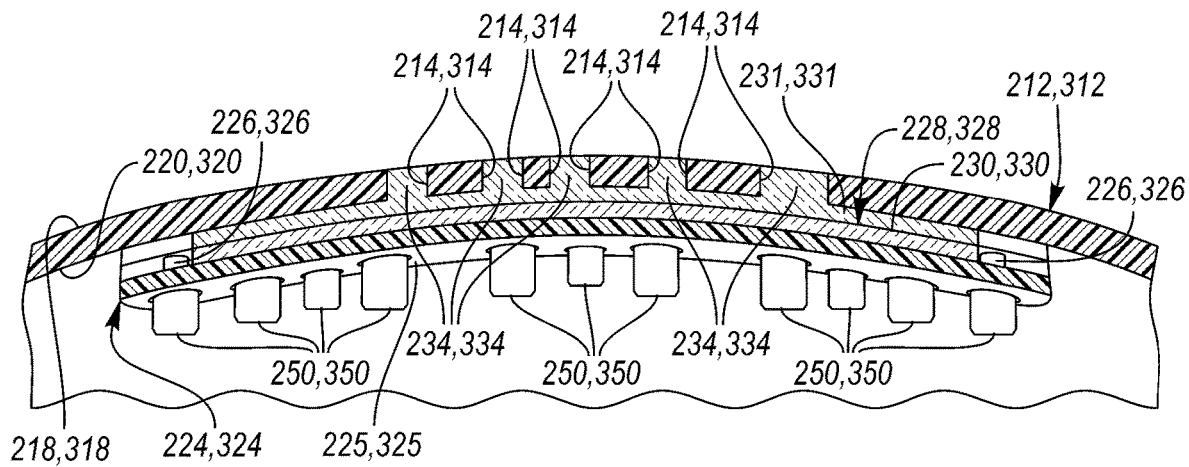
FIG. 11 is a view similar to the view of FIG. 10 where the use of black and white paint (not shown) is described.
Figure 12:
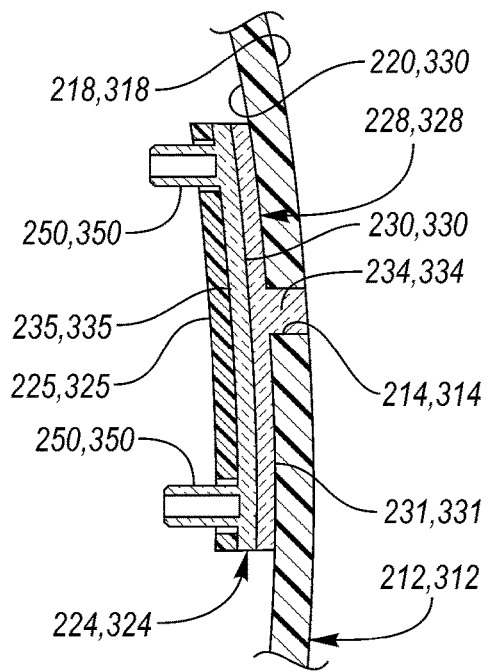
FIG. 12 is a side view, partially broken away and in cross section, of the assembly of FIG. 7 and the assembly of FIG. 8.
Figure 13:
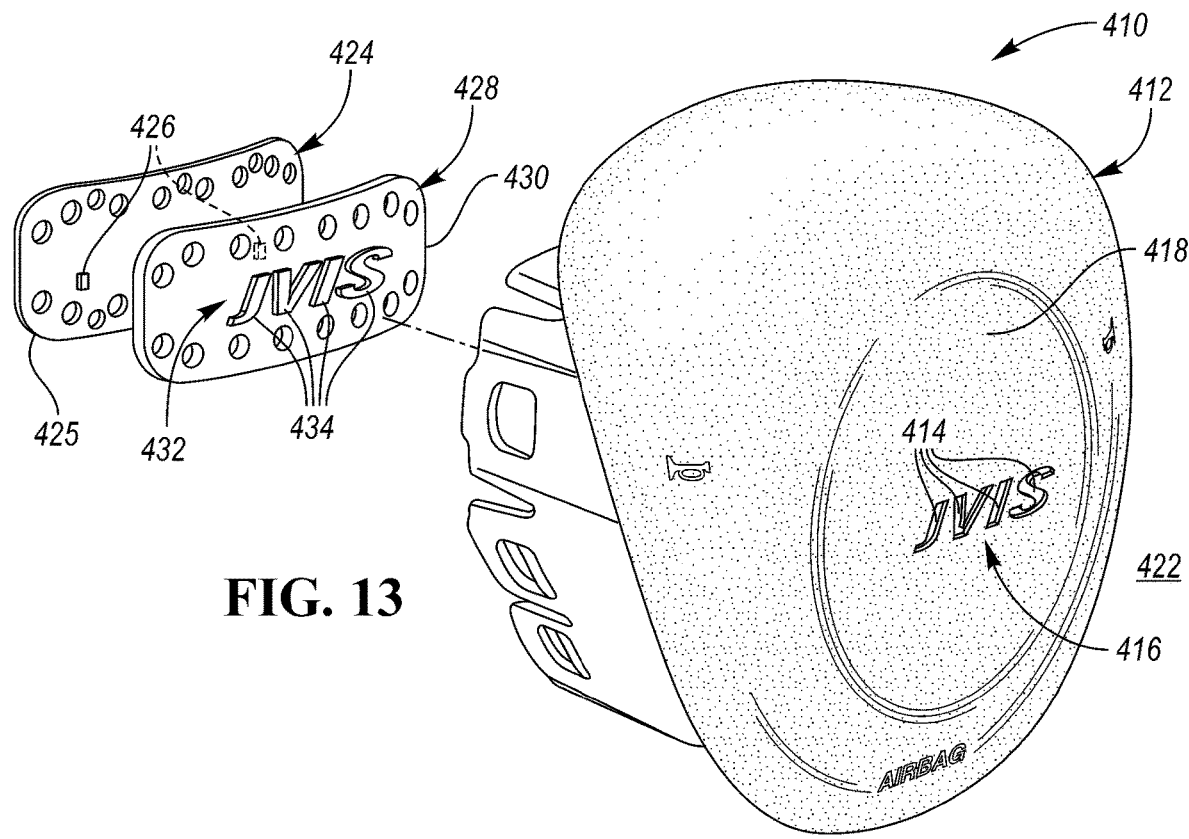
FIG. 13 is an exploded perspective view of a vehicle interior trim assembly constructed in accordance with a fourth embodiment of the present invention.
Figure 14:
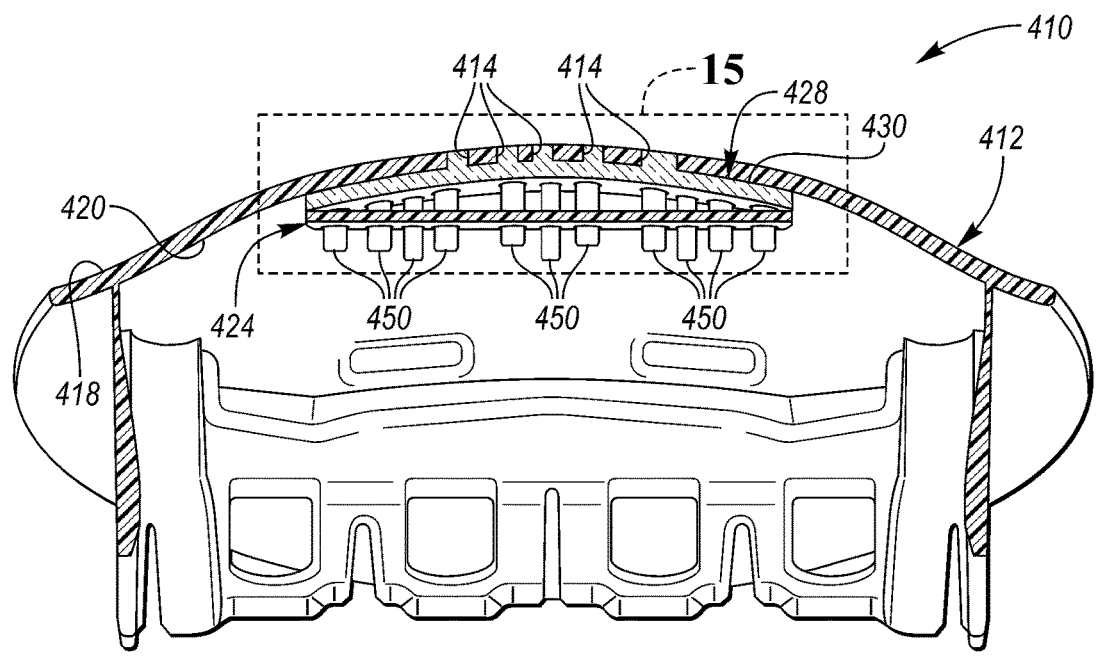
FIG. 14 is a side sectional view of the assembly of FIG. 13.

FIGS. 6 and 9-12 are applicable to $2^{nd}$ and $3^{rd}$ embodiments. FIG. 7 is applicable to the $2^{nd}$ embodiment. FIG. 8 is applicable to the $3^{rd}$ embodiment. FIGS. 13-16 are applicable to the fourth embodiment. In view of the above, the first embodiment is described using a one hundred series of numbers; the second embodiment is described using a two hundred series of numbers; the third embodiment is described using a three hundred series of numbers and the fourth embodiment is described using a four hundred series of numbers, wherein the same or similar part in each of the embodiments has the same reference number in the series as described hereinbelow.

The assembly 110 may be a vehicle air bag cover assembly including a vehicle interior trim part or air bag cover 112 having at least one and preferably a plurality of openings 114 which define an emblem pattern 116. The openings 114 extend between front and back surfaces 118 and 120, respectively, of the part 112. The front surface 118 faces a passenger compartment 122 of the vehicle.

An illumination module, generally indicated at 124, is mounted to the back surface 120 of the part 112 and includes at least one light source 126 such as one or more light emitting diodes (LED) configured to generate visible light rays when energized.

A lens, generally indicated at 128, including at least one layer 130 is molded in a molding process to have a 3D emblem shape 132. The lens 128 is fitted through and matches the openings 114. The lens 128 has at least one and preferably a plurality of surface-defining portions 134 which are sized and shaped and spaced apart to have the emblem pattern 116 at the front surface 118 of the part 112. The lens 128 gathers and redirects light rays from LEDs 126 of the illumination module 124 to generate light of substantially uniform intensity in the emblem pattern 116 through the surface-defining portions 134 and into the passenger compartment 122.

Figure 4:
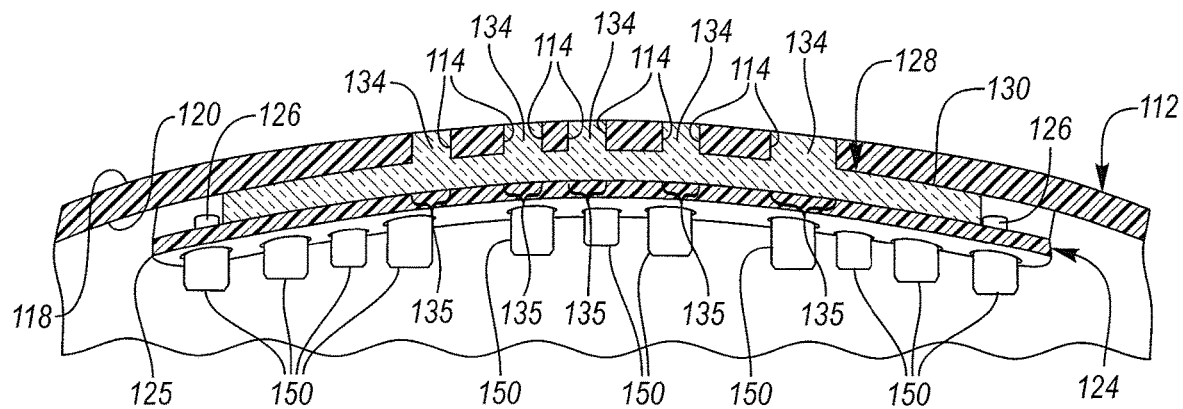
FIG. 4 is an enlarged view, partially broken away and in cross section, of the assembly of FIGS. 1-3 contained within the box labeled "4" in FIG. 2.
Figure 5:
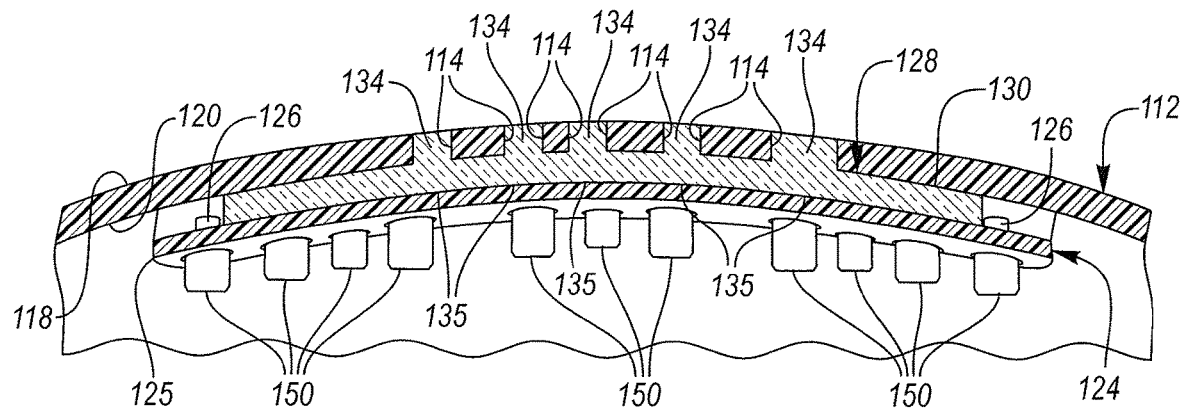
FIG. 5 is a view similar to the view of FIG. 4, wherein the use of black and white paint (not shown) is described.
Figure 6:
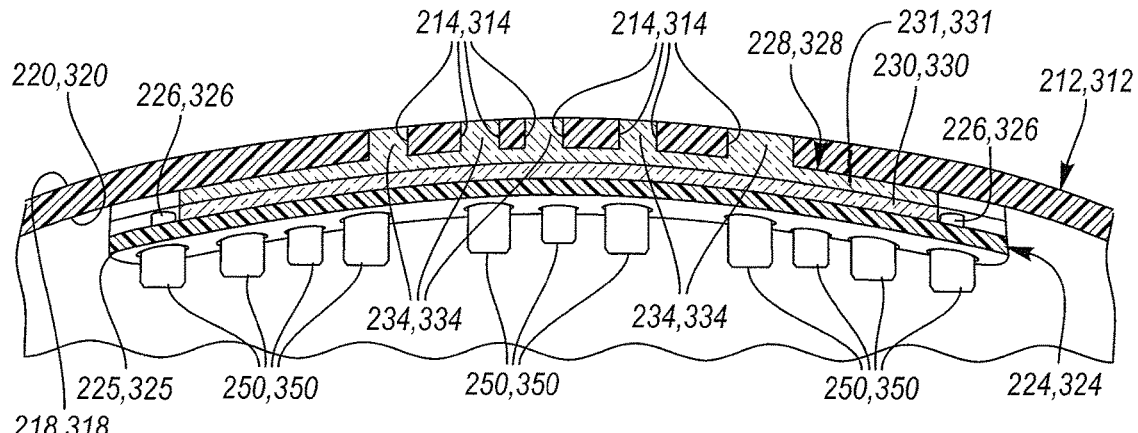
FIG. 6 is a view, partially broken away and in cross sectioning, illustrating how the various components of at least one embodiment (the $2^{nd}$ and $3^{rd}$ embodiments) of the invention are mounted at the rear of the air bag cover.

As shown in FIG. 4 via brackets 135, the backside of the lens 128 is textured opposite corresponding extraction areas (i.e. surface-defining portions 134) as is well known in the art cited in the above-noted Overview section of this application.

In one embodiment, the at least one layer 130 comprises a single layer molded from a transparent, optical-grade material such as PMMA or PC.

In another embodiment, the at least one layer 130 comprises a single layer molded from an optical-grade, light diffusing material which causes the light rays to emerge diffusely from the surface-defining portions 134.

Figure 1:
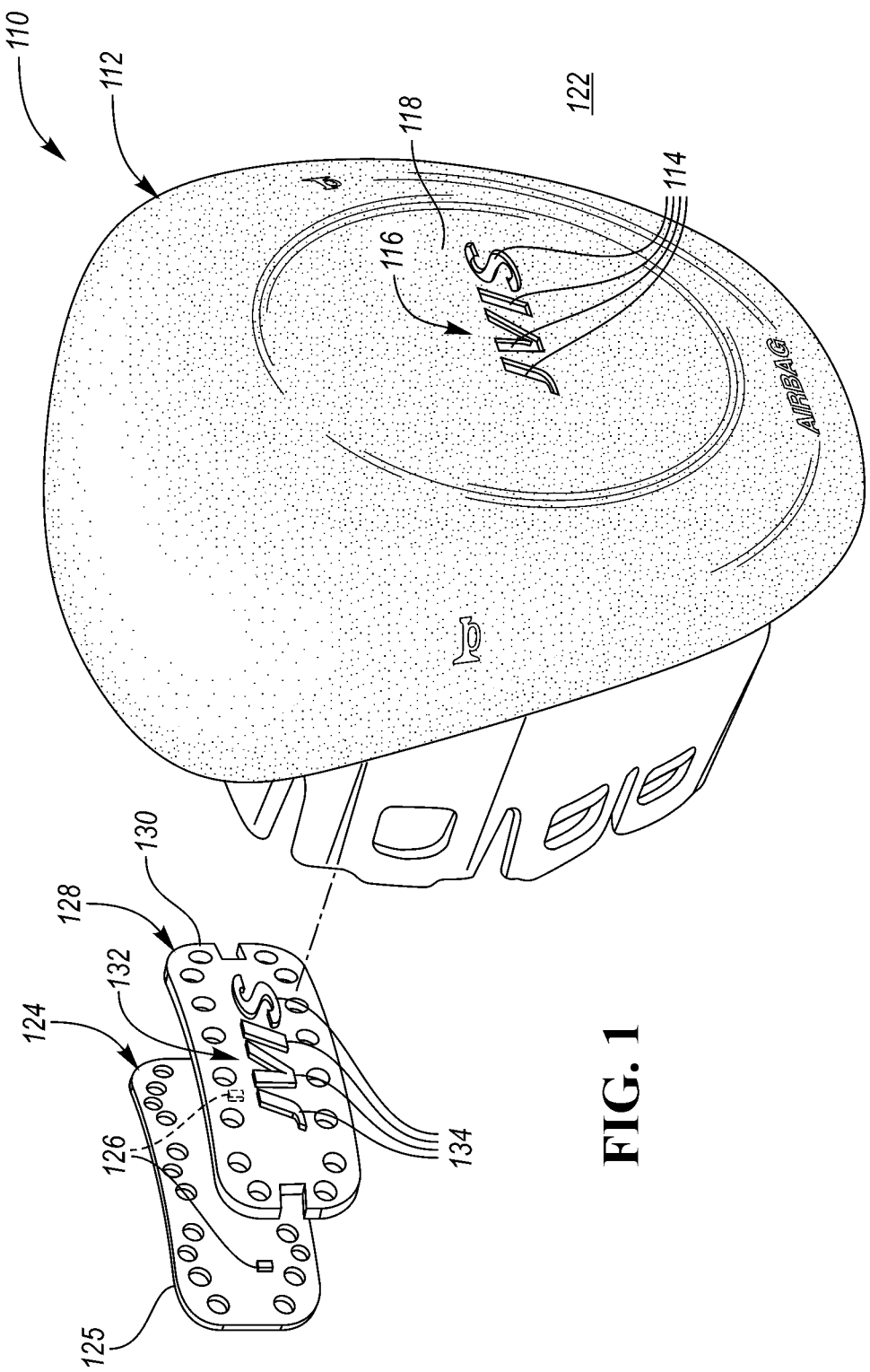
FIG. 1 is an exploded perspective view of a vehicle interior trim assembly constructed in accordance with an embodiment of the present invention.
Figure 2:
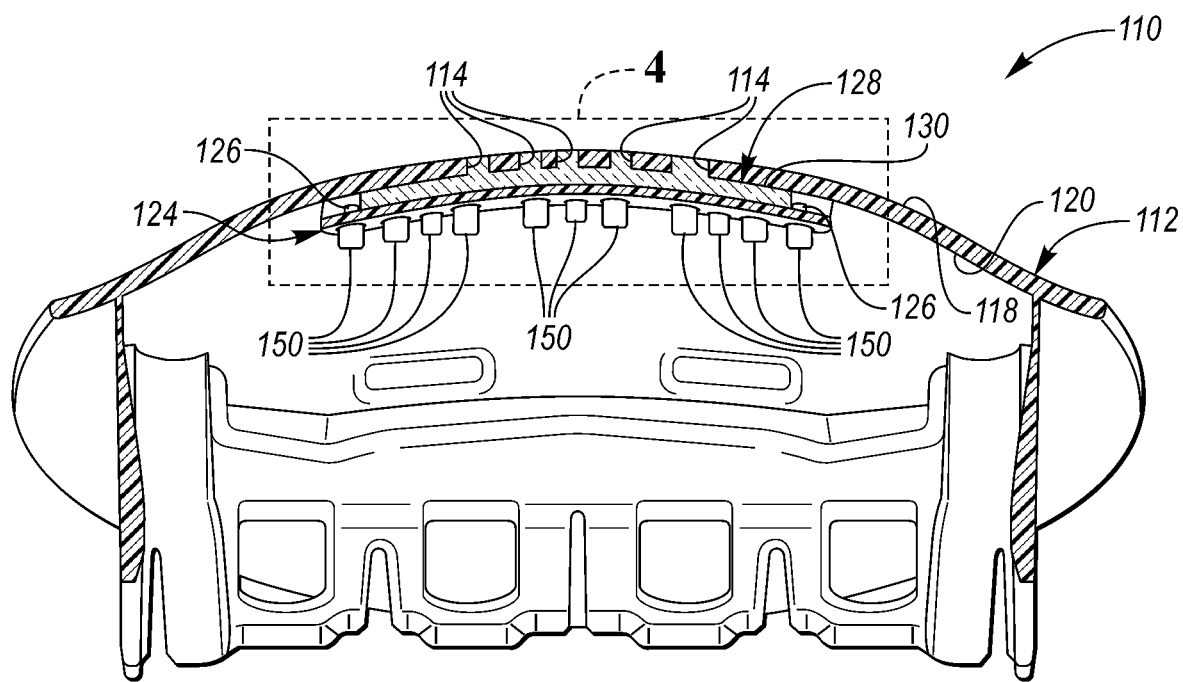
FIG. 2 is a side sectional view of the assembly of FIG. 1.
Figure 3:
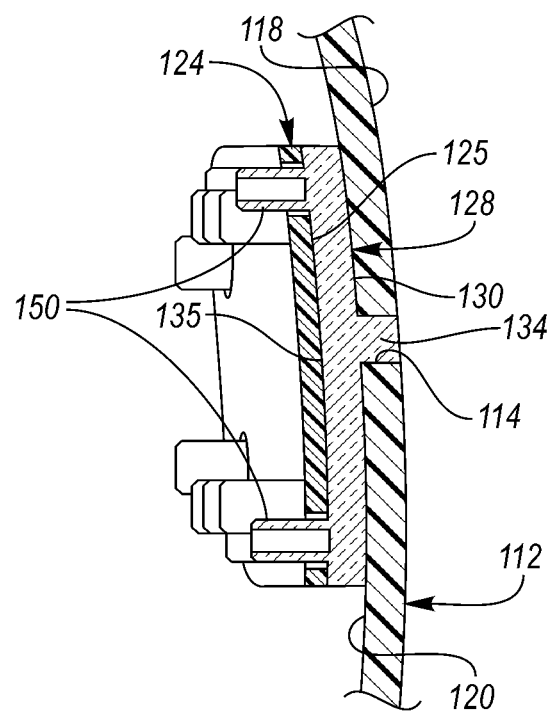
FIG. 3 is a side view, partially broken away and in cross section of the assembly of FIGS. 1 and 2.

Referring to FIG. 3, the assembly may further include a layer (not shown) of light-diffusing coating material overlying the surface-defining portions 134 and having substantially the same size and shape as the at least one surface-defining portion 134. Preferably, the layer of coating material includes a white paint layer.

In painted versions of the first embodiment (i.e. FIGS. 3-5), the entire front surface is painted white, then painted black. Then the black paint is laser etched off, to expose the light emitting surface. The light can be extracted in multiple manners, including:

1. Removing black paint on entire lens surface protruding through the cover. This illuminates entire face of letters.

2. Removing black paint around periphery of lens surface protruding through. This illuminates around sides of letters as edge lit.

Black paint may be eliminated if air bag cover blocks all non-lit areas.

Preferably, the lens 128 has a set of surface-defining portions 134 which are sized, shaped and arranged laterally relative to each other in the emblem pattern 116 at the front surface 118 of the part 112.

An opaque layer (i.e. black paint layer—not shown) preferably covers the layer of coating material (i.e. white layer) to block light rays from entering the passenger compartment 122 from the covered layer of coating material and to allow light rays to emerge diffusely from the layer of coating material not covered by the opaque layer. The opaque layer preferably comprises an opaque (i.e. black) paint layer.

Referring now to FIG. 7, there is illustrated another embodiment of the present invention wherein assembly 210 includes a lens 228 including a first layer 230 molded from a transparent, optical-grade material in the molding process and a second layer 231 bonded to the first layer 230 and formed from a diffuse material molded onto the first layer 230 in the molding process.

The molding process is preferably an injection molding process such as a multi-shot molding process. Consequently, the lens 228 is 2-shot, dual molded lens. The clear layer 230 is transmitting light through and the diffused layer 231 scatters light before it comes out of the lettering at the front of the air bag cover 212. This option optimizes light across the part 212 before it is spread.

Referring now to FIG. 8, there is illustrated another embodiment of the assembly, generally indicated at 310. The assembly 310 includes a lens 328 which includes a first layer 330 molded from a transparent, optical-grade material and formed as a first integral unitary structure. A second layer 331 is molded from a diffuse material and formed as a second integral unitary structure. The layers 330 and 331 are snapped-into engagement to form the lens 320. This embodiment is similar to the 2-shot embodiment, but the lens materials are molded separately and snapped together. FIGS. 9-12 (as well as FIG. 6) are also applicable to the second embodiment (i.e. the 2-shot embodiment) and consequently, includes two hundred series reference numbers.

At least one and, preferably, two light emitting diode 126, 226 and 326 (LEDs) flank the lens 128, 228 and 328, respectively, in the above-described embodiments.

Also, in each of the embodiments, the illumination modules 124, 224 and 324 include an electrically conductive circuit (not shown) wherein the LEDs 126, 226 and 336 are electrically coupled to their respective circuits.

Referring to each of the above-described embodiments again, the opaque (i.e. black) layer overlying the white layer of coating material is preferably engraved by a laser beam having energy of a predetermined wavelength which is absorbed by the opaque layer to at least initiate ablation of the material of the opaque layer.

Referring now to FIGS. 13-16, there is illustrated yet another embodiment of the assembly, generally indicated at 410. In this embodiment, a pair of LEDs 426 shoot light across back of a lens 428 and not into its sidewall. Light spreads across behind the lens 428 and is extracted across from textured sections of the lens 428 similar to the first three embodiments.

Figure 15:
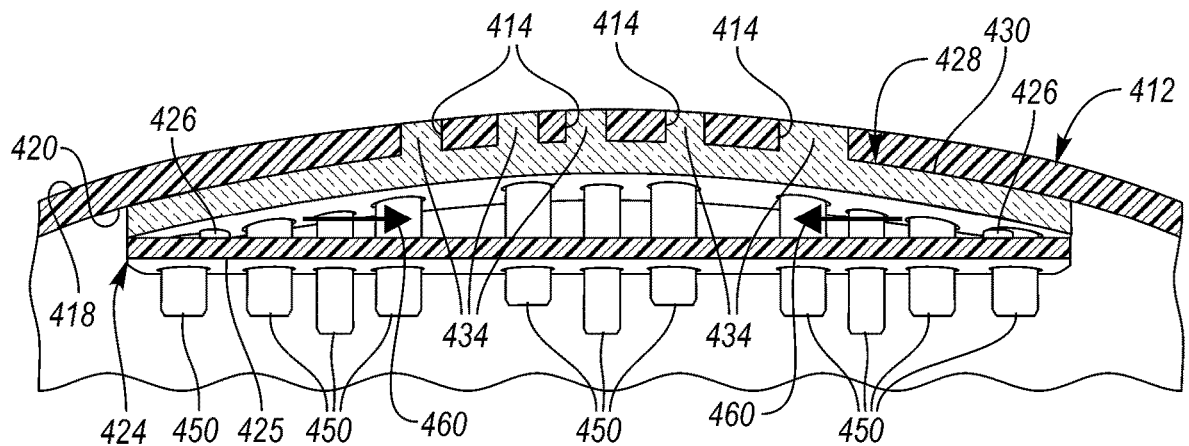
FIG. 15 is an enlarged view, partially broken away and in cross section of the assembly of FIGS. 13 and 14 contained within the box labeled "15" in FIG. 14.
Figure 16:
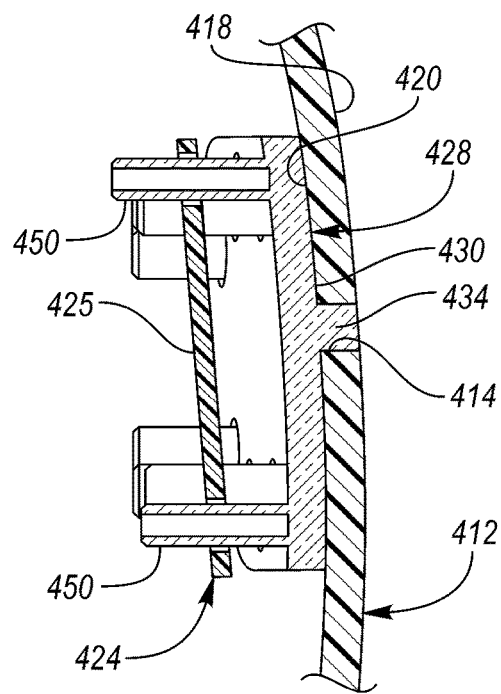
FIG. 16 is a side view, partially broken away and in cross section of the assembly of FIGS. 13-15.

As shown in FIG. 15, light travels behind the lens 428 across the part 412 in the direction of arrows 460.

In general, and referring to many of the drawing figures, (especially FIG. 6), each assembly 110, 210, 310 or 410 is mounted to the back surface 120, 220, 320, or 420 of its cover 112, 212, 312 or 412 by hollow mounting features/pins 150, 250, 350 or 450 which extend from the back surface 120, 220, 320 or 420 of its air bag cover 112, 212, 312 or 412 through holes formed through the lens 128, 228, 328 or 428 and printed circuit board 125, 225, 325 or 425. The pins 150, 250, 350 or 450 can be heat staked or other attachment method can be utilized. The features/pins 150, 250, 350 or 450 passing through the lens 128, 228, 328 or 428 also pass through the printed circuit boards 125, 225, 325 or 425 on which the control circuits are formed. In this way, all of the components of the assemblies 110, 210, 310 and 410 are mounted onto the back surfaces 120, 220, 320 and 420 of their respective air bag covers 112, 212, 312 and 412.

Each air bag assembly 110, 210, 310 or 410 is suitable for use with an automobile, which can be any passenger vehicle used for land transportation, such as a car, minivan, truck, etc. According to alternative embodiments, the assemblies may be used with any type of vehicle, such as water vehicles, air vehicles, etc.

Each control circuit may be electrically connected to a controller which, in turn, is electrically connected or coupled to an electrical system of the vehicle. The LEDs 126, 226, 326 or 426 may be selectively turned "on" and "off" by the controller which controllably supplies electrical power from the system to the control circuits. The controller is typically electrically connected to one or more switches and/or one or more sensors so that the circuits can be manually or automatically operated to turn the LEDs "on" or "off". For example, each controller can be electrically connected to an ignition switch, a light sensor, a headlight switch and/or an interior light switch as needed and/or desired.

The lens/substrate 128 is typically molded from a transparent, optical grade polymer such as clear PMMA or PC. Alternatively, the lens 128 may be molded from a diffused or diffusing polymer such as PMMA or PC with a light diffusing additive such as self-reflecting particles.

The illumination module 124, 224, 324 or 424 may include an aperture printed circuit board (PCB) 125, 225, 325 or 425, respectively, which may include a control circuit or be coupled to a control circuit. The control circuit coupled to the printed circuit board and/or the printed circuit board comprising the control circuit can comprise one or more analog and/or digital electrical or electronic components, and may include a microprocessor, microcontroller, application-specific integrated circuit (ASIC), programmable logic, and/or other circuit elements. According to an exemplary embodiment, the control circuit is configured to receive data via one or more electrical wires or buses from one or more automobile systems within the automobile. For example, the control circuit can be configured to receive data from sensors on the automobile. According to various exemplary embodiments, the circuit board may be a printed circuit board, a flexible circuit board, a rigid circuit board, conductive foil, and/or other suitable form.

Preferably, the decorative opaque layer portions overlying the front exit surfaces of the lens are engraved by a laser beam having energy which is absorbed by the decorative layer portions to at least initiate ablating of the material of the decorative opaque layer portions at a pattern of predetermined locations (i.e., the front exit faces of the lens). In a preferred embodiment, a CNC laser cutting and engraving system available from Epilog Laser Inc. of Golden, Colo. performs the engraving from a digital image.

In other words, during the laser engraving/etching process, undesired material from the opaque paint layer is selectively ablated. Wavelength of the etching laser pulses is matched to a desired wavelength characteristic of the opaque part layer and the tuned laser pulses are directed by the system onto the undesired material. Pulse duration, wavelength, or both, of the laser pulses are controlled to ablate the undesired material without damaging the lens or any adjacent material.

During the laser-engraving process, air may be circulated over the front surfaces of the lens to remove gases produced by the laser-engraving process, and to cool the surfaces to prevent damage to the surfaces of the lens. The front surfaces generally comprise exposed polymer material that is substantially flat and free of surface irregularities or other defects that could otherwise cause non-uniform illumination/appearance.

A digital image/file may be transmitted from a PC or the like from a remote location to a processing/fabricating facility at which the digital image is utilized to program the CNC laser-engraving machine. The digital file/image may be edited to form a digital file in a format that can be used by the laser-engraving/etching machine. For example, graphics editing software may be utilized to create a digital file having a format that can be used by the laser-engraving etching machine. The process can be utilized to custom-make emblems or logos having unique designs according to a particular customer's request/order. For example, emblems may comprise the customer's name, a phrase or slogan chosen by the customer, or a specific design specified by an individual customer. The CNC laser-engraving machine can be utilized to remove portions of the opaque decorative layer to provide the specified pattern or design for a particular customer.

As described above, each air bag cover 112, 212, 312 or 412 is typically molded from a polymer or plastic to define openings 114, 214, 314, or 414 which form the logo or image as shown in the drawing figures. Then the lens 128, 228, 328 or 428, respectively, having the logo or image inserted through the openings 114, 214, 314, or 414 in the air bag cover. The resulting pattern is visible by itself and also can be illuminated as previously described.

The illumination modules 124, 224, 324 or 424 may include one or more light sources such as an incandescent bulb, a fluorescent bulb, a light emitting diode (LED), a light pipe, an electroluminescent device, a neon or argon bulb or fiber optics. The light source(s) may produce light of any color or from any portion of the light spectrum. In various exemplary embodiments, a light filter (not shown) may be placed between the light source and the portions of the side surfaces of the lens. Also, the light source(s) may be included on or in its assembly or spaced away from its assembly.

In summary, the trim assembly 110, 210, 310 or 410 is provided with a feature for lighting to show a logo or image at the front of the assembly. The lighted logo or image can be seen on an A-surface of the part such as an air bag cover 112, 212, 312 or 412, respectively. The image or logo can be viewed during the day and may be illuminated at night.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle interior trim assembly having an illuminable emblem, the assembly comprising:
    a vehicle interior trim part having at least one opening which defines an emblem pattern, the at least one opening extending between front and back surfaces of the part, the front surface facing a passenger compartment of the vehicle;
    a lens including at least one layer and a 3D emblem shape fitted through and matching the at least one opening, the lens having at least one surface-defining portion which is sized and shaped to have the emblem pattern at the front surface of the part; and
    an illumination module mounted to the back surface of the part and including at least one light source flanking the at least one layer of the of the lens, the at least one light source generating visible light rays when energized that travel through the at least one layer of the lens, wherein the lens redirects light rays from the at least one layer to the 3D emblem shape of substantially uniform intensity through the at least one surface-defining portion and into the passenger compartment.
2. The assembly as claimed in claim 1, wherein the at least one layer comprises a single layer molded from a transparent, optical-grade material.
3. The assembly as claimed in claim 1, wherein the at least one layer comprises a single layer molded from an optical-grade material which causes the light rays to emerge diffusely from the at least one surface-defining portions.
4. The assembly as claimed in claim 1 further comprising a layer of light-diffusing coating material overlying the at least one surface-defining portion and having substantially the same size and shape as the at least one surface-defining portion.
5. The assembly as claimed in claim 4, wherein the layer of coating material includes a paint layer.
6. The assembly as claimed in claim 4 further comprising an opaque layer covering the layer of coating material to block light rays from entering the passenger compartment from the covered layer of coating material and to allow light rays to emerge diffusely from the layer of coating material not covered by the opaque layer.
7. The assembly as claimed in claim 6, wherein the opaque layer comprises an opaque paint layer.
8. The assembly as claimed in claim 6, wherein the opaque layer overlying the layer of coating material is engraved by a laser beam having energy of a predetermined wavelength which is absorbed by the opaque layer to at least initiate ablation of the material of the opaque layer in the emblem pattern.
9. The assembly as claimed in claim 1, wherein the lens has a set of surface-defining portions which are sized, shaped and arranged laterally relative to each other in the emblem pattern at the front surface of the part.
10. The assembly as claimed in claim 1, wherein the lens includes a first layer molded from a transparent, optical-grade material in a molding process and a second layer bonded to the first layer and formed from a diffuse material molded onto the first layer in the molding process.
11. The assembly as claimed in claim 10, wherein the molding process is an injection molding process.
12. The assembly as claimed in claim 11, wherein the injection molding process comprises a multi-shot molding process.
13. The assembly as claimed in claim 1, wherein the lens includes a first layer molded from a transparent, optical-grade material and formed as a first integral unitary structure and a second layer molded from a diffuse material and formed as a second integral unitary structure, and wherein the layers are snapped-into engagement to form the lens.
14. The assembly as claimed in claim 1, wherein the at least one light source includes at least one light emitting diode (LED) which flanks the lens.
15. The assembly as claimed in claim 14, wherein the illumination module includes an electrically conductive circuit and wherein the LED is electrically coupled to the circuit.
16. A vehicle air bag cover assembly having an illuminable emblem, the assembly comprising:
    a vehicle air bag cover having at least one opening which defines an emblem pattern, the at least one opening extending between front and back surfaces of the air bag cover, the front surface facing a passenger compartment of the vehicle;
    a lens including at least one layer molded in a molding process to have a 3D emblem shape fitted through and matching the at least one opening, the lens having at least one surface-defining portion which is sized and shaped to have the emblem pattern at the front surface of the air bag cover; and
    an illumination module mounted to the back surface of the air bag cover and including at least one light source flanking the at least one layer of the lens and generating visible light rays when energized that travel through the at least one layer of the lens, wherein the lens redirects light rays from the at least one layer to the 3D emblem shape of substantially uniform intensity through the at least one surface-defining portion and into the passenger compartment.
17. The assembly as claimed in claim 16, wherein the at least one layer comprises a single layer molded from a transparent, optical-grade material.
18. The assembly as claimed in claim 16, wherein the at least one layer comprises a single layer molded from an optical-grade material which causes the light rays to emerge diffusely from the at least one surface-defining portion.

19. The assembly as claimed in claim 16 further comprising a layer of light-diffusing coating material overlying the at least one surface-defining portion and having substantially the same size and shape as the at least one surface-defining portion.

20. The assembly as claimed in claim 19, wherein the layer of coating material includes a paint layer.

21. The assembly as claimed in claim 19 further comprising an opaque layer partially overlying the layer of coating material to block light rays from entering the passenger compartment from the covered layer of coating material and to allow light rays to emerge diffusely from the layer of coating material not covered by the opaque layer.

22. The assembly as claimed in claim 16, wherein the lens has a set of surface-defining portions which are sized, shaped and arranged laterally relative to each other in the emblem pattern at the front surface of air bag.

23. The assembly as claimed in claim 21, wherein the opaque layer comprises an opaque paint layer.

24. The assembly as claimed in claim 21, wherein the opaque layer overlying the layer of coating material is engraved by a laser beam having energy of a predetermined wavelength which is absorbed by the opaque layer to at least initiate ablation of the material of the opaque layer in the emblem pattern.

25. The assembly as claimed in claim 16, wherein the lens includes a first layer molded from a transparent, optical-grade material in the molding process and a second layer bonded to the first layer and formed from a diffuse material molded onto the first layer in the molding process.

26. The assembly as claimed in claim 25, wherein the molding process is an injection molding process.

27. The assembly as claimed in claim 26, wherein the injection molding process comprises a multi-shot molding process.

28. The assembly as claimed in claim 16, wherein the lens includes a first layer molded from a transparent, optical-grade material and formed as a first integral unitary structure and a second layer molded from a diffuse material and formed as a second integral unitary structure, and wherein the layers are snapped-into engagement to form the lens.

29. The assembly as claimed in claim 16, wherein the at least one light source includes at least one light emitting diode (LED) which flanks the lens.

30. The assembly as claimed in claim 29, wherein the illumination module includes an electrically conductive circuit and wherein the LED is electrically coupled to the circuit.

* * * * *

UNITED STATES PATENT AND TRADEMARK OFFICE
CERTIFICATE OF CORRECTION

PATENT NO. : 10,507,764 B2
APPLICATION NO. : 15/637054
DATED : December 17, 2019
INVENTOR(S) : Ingo E. Schneider et al.

Page 1 of 1

It is certified that error appears in the above-identified patent and that said Letters Patent is hereby corrected as shown below:

In the Claims

Column 11, Lines 43-44, Claim 1:
After "flanking the at least one layer of the"
Delete "of the" (second occurrence)

Signed and Sealed this
Seventeenth Day of March, 2020

Andrei Iancu
*Director of the United States Patent and Trademark Office*